2 Sheets--Sheet 1.

T. M. & J. BROOKS.
Improvement in Combined Planter and Cultivator.

No. 126,258. Patented April 30, 1872.

Attest:
Jas. H. Layman
Walter H. Knight

T. M. & J. Brooks
INVENTORS.
By Knight Bros.
Attys

2 Sheets--Sheet 2.

T. M. & J. BROOKS.
Improvement in Combined Planter and Cultivator.

No. 126,258. Patented April 30, 1872.

Attest:
Jas. H. Layman.
Walter H. Knight.

T. M. & J. Brooks.
INVENTORS.
By Knight Bros
Attys.

UNITED STATES PATENT OFFICE.

THOMAS M. BROOKS AND JOHN BROOKS, OF CINCINNATI, OHIO.

IMPROVEMENT IN COMBINED PLANTERS AND CULTIVATORS.

Specification forming part of Letters Patent No. 126,258, dated April 30, 1872.

We, THOMAS M. BROOKS and JOHN BROOKS, of Cincinnati, Hamilton county, Ohio, have invented a new and useful Convertible Planter and Cultivator, of which the following is a specification:

Our invention relates to a new and useful implement, whereby corn or other grain can be planted in hills, and which, by certain changes, easily effected, can be made available either as an ordinary three-bladed cultivator or as a double-shovel plow.

Figure 1:
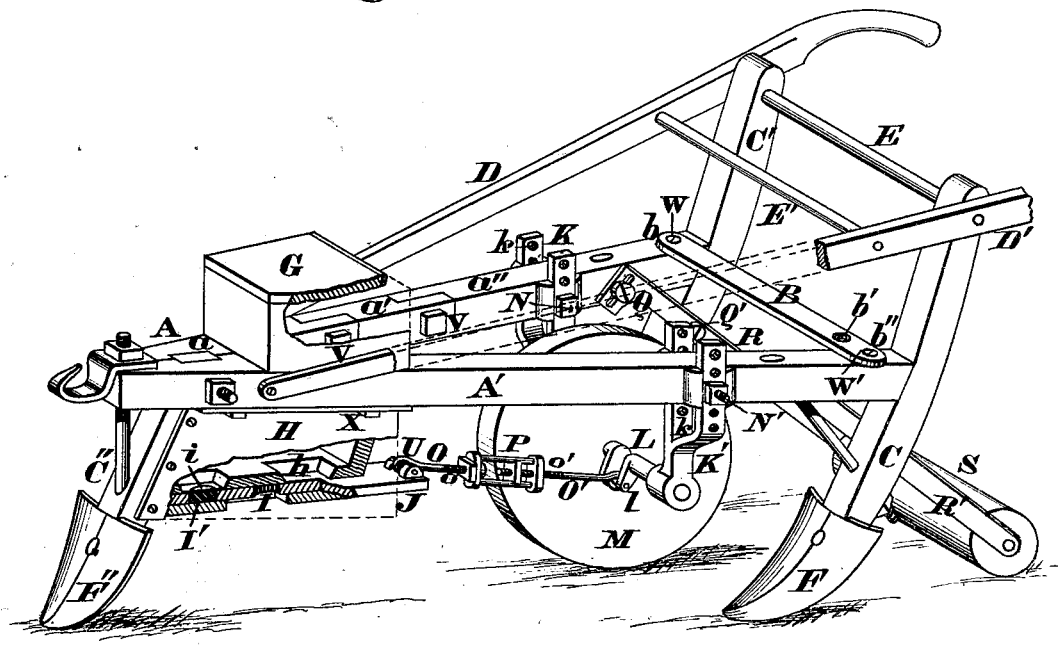
Figure 2:
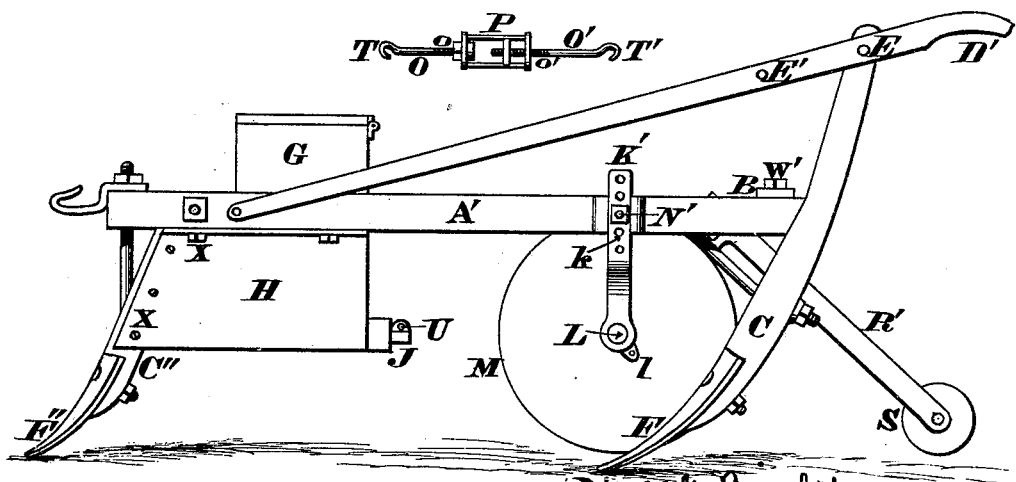
Figure 3:
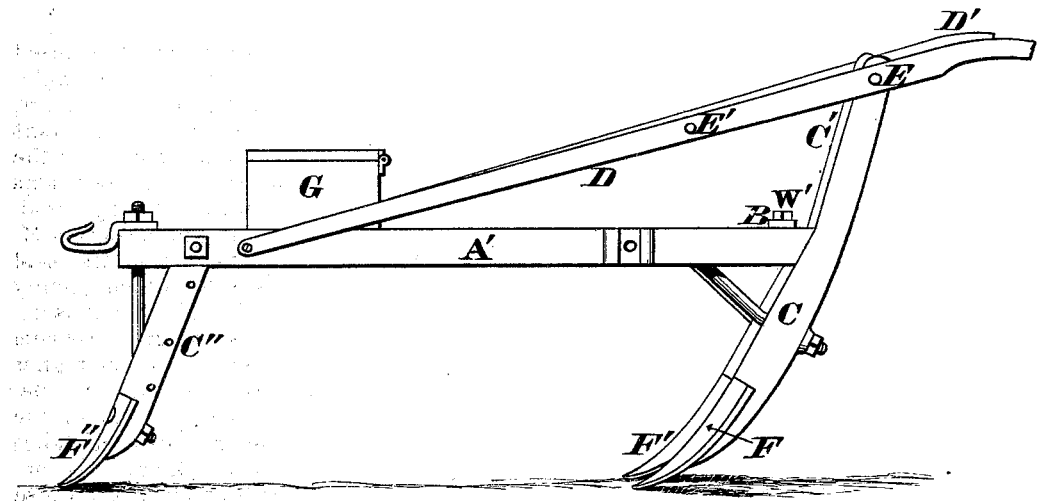
Figure 4:
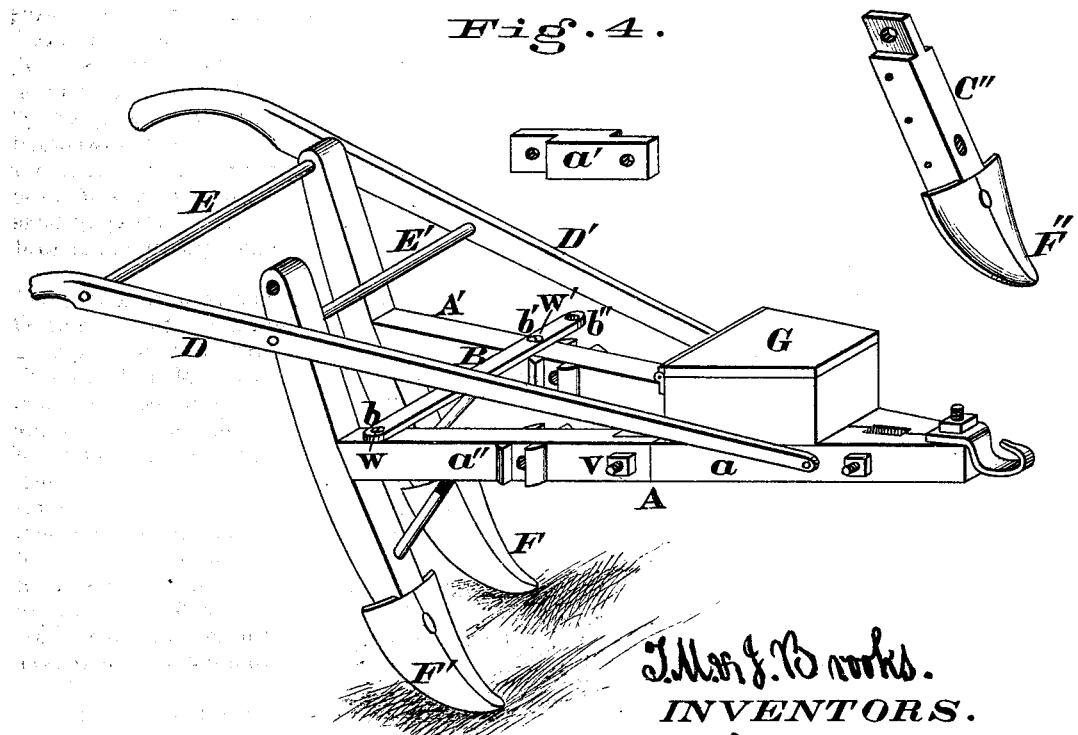

Figure 1 represents, by perspective view, our implement in condition for planting, the lower portion of grain-dropper being in section. Fig. 2 represents the implement converted to a wheeled cultivator. Fig. 3. represents the implement converted to a three-bladed cultivator without wheels; and Fig. 4 represents its condition as a double-shovel plow.

The frame of our implement consists, essentially, of the following parts, to wit: Of two beams, A A', which are joined in front, and which diverge rearward, where they are connected by a brace, B, having three holes, $b$ $b'$ $b''$, to receive two bolts, W W'. Said beams abut against two customary legs or standards, C C', to which they are firmly secured. One beam, A, consists of three parts or sections, $a$ $a'$ $a''$, lapped or halved, and secured by bolts V to each other. Customary handles D D', fastened near the front of the beams, extend obliquely upward and rearward, and are secured to the standards by receiving in common therewith the ends of a round or stretcher, E. Another round or stretcher, E', extends from handle to handle, somewhat in front of the stretcher E. The standards C C', and one in front, C'', are armed at bottom with shares or shovels F F' F'' of any approved form. Surmounting the frame A A', near its front, is a grain-box or hopper, G, which discharges into a receptacle, H, so secured beneath the frame and to the standard C'' by bolts X as to be easily removed, and having in its bottom an aperture, $h$, to permit the escape into the furrow created by the shovel F'' of the modicum of grains contained in one or other of the pockets I or I' of the dropping-slide J. When only one of the pockets is used the other pocket is closed by a plug, $i$; thus, for example, the implement being set for planting four feet apart, when using one hole, can be made to plant two feet apart in the row by removing the plug $i$. Extending downward from the beams A A' are hangers K K', which afford journal-bearing for the shaft L of ground-wheel M. The said hangers are attached to the said beams by means of bolts N N', which occupy one of a series of orifices, $k$, and when it is desired to elevate or depress the ground-wheel the said bolts are inserted in lower or higher pairs of said orifices, as the case may be. Between the said ground-wheel and one of the hangers the shaft L of the ground-wheel takes the form of a crank, $l$, to which crank is connected the slide J by means of a pitman, whose two members, O O', have, respectively, right-and-left screw-threads, $o$ $o'$, for a swivel, P, which, being turned to right or left, operates to lengthen or to shorten the pitman. Hooks T T', at the remote ends of the members O O', engage, respectively, over the crank $l$ and a pin, U, on the slide. Secured by bolts Q Q' Q'' Q''' to the frame, so as to project downward and backward, as shown, are hangers R R', for a covering-roller, S. The upper ends of these hangers are slotted where the bolts Q Q' pass through them to enable an adjustment of said roller up or down.

The implement is converted to a wheeled cultivator by simply detaching the pitman O O', and to an ordinary cultivator by detaching in addition the ground-wheel M and roller S. When desired for use as a double-shovel plow, we detach also the front shovel F'' and the grain-receptacle H, detach the right ends of the stretchers E E' and brace B, unbolt the section $a'$ and take it out, bring the two members $a$ $a''$ so as to lap, and bolt them together; reinsert the right ends of the stretchers, and reattach the lift end of the brace by inserting its bolt in supplementary orifice $b'$. These changes being effected, the implement will assume the form of a customary double-shovel plow, as in Fig. 4.

We claim as new and of our invention—

1. The construction and arrangement of the divided beams A *a a' a''*, brace B, stretchers E E', fixed shovels F F', removable shovel F'', seeding apparatus G H I J K, shaft L, wheel M, and roller R S, as and for the purposes set forth.

2. The detachable and extensible pitman O O' *o o'* T T', in combination with the seed-slide J, crank L, and adjustable wheel M, to adapt the slide to work as required while the frame is at any height, and dispense with the need of springs.

In testimony of which invention we hereunto set our hands.

THOMAS M. BROOKS.
JOHN BROOKS.

Attest:
GEO. H. KNIGHT,
JAMES H. LAYMAN.